Dec. 8, 1936.  J. R. DOHERTY  2,063,662
ENCASED REEL
Filed Sept. 3, 1935
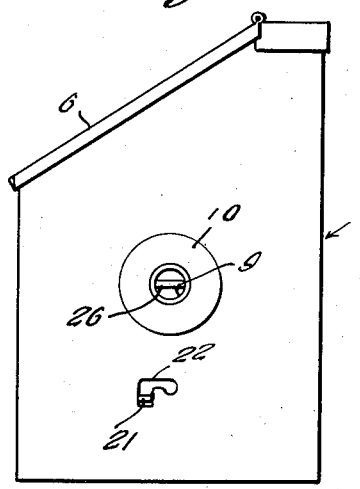
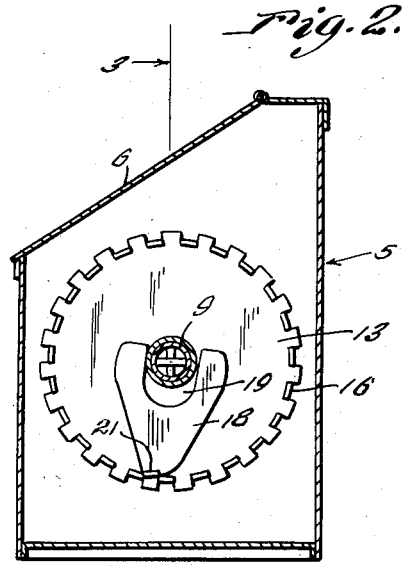
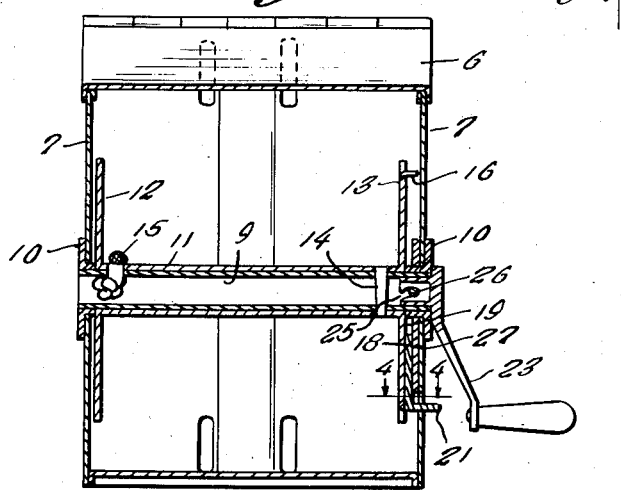
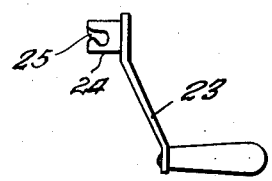
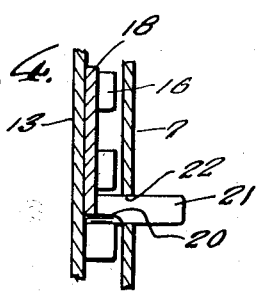
Inventor
John R. Doherty
By Clarence A. O'Brien
Attorney Patented Dec. 8, 1936

2,063,662

UNITED STATES PATENT OFFICE 2,063,662

ENCASED REEL

John R. Doherty, Bethlehem, Pa.

Application September 3, 1935, Serial No. 39,066

2 Claims. (Cl. 242—101)

This invention relates to reel structures, and more particularly to a housed or encased reel for clotheslines.

More particularly, the invention is concerned with an improved mounting for the reel involving a novel and efficient dog and ratchet mechanism to prevent rotative movement of the reel in a predetermined direction.

The invention together with its objects and advantages will be best understood from a study of the following description taken in connection with the accompanying drawing, wherein—

Figure 1 is a side elevational view of the invention with the handle removed.

Figure 2 is a view somewhat similar to Figure 1 but with the near side plate removed to show the dog and ratchet mechanism.

Figure 3 is a sectional view taken substantially on line 3—3 of Figure 2.

Figure 4 is a detailed view taken substantially on line 4—4 of Figure 3.

Figure 5 is an elevational view of a handle.

Referring to the drawing by reference numerals, it will be seen that 5 indicates generally a housing which is in the form of a box-like structure provided at its top with a suitable hinged lid 6. Opposed side walls 7 of the housing 5 are provided with openings to accommodate a hollow shaft 9 upon which the reel is mounted. Suitably secured on the ends of the shaft 9 are flanged collars 10, the flanges of the collars engaging the outer sides of the walls 7 with the collars being accommodated within the aforementioned openings.

The improved reel comprises a hub 11 which accommodates the shaft 9 as shown and flanges 12 and 13 respectively provided on the respective opposite ends of the hub 11. The flanges 12 and 13 are secured to the hub in any suitable manner, preferably by being integral therewith.

Hub 11 and shaft 9 are provided with suitably aligned openings for receiving a pin 14 through the medium of which the hub of the wheel is secured to the shaft 9 for rotating therewith. Also the shaft 9 and hub 11 are provided with suitable openings through which the knotted end of the clothesline or the like 15 is trained for securing one end of the line on the hub of the reel to facilitate the winding of the clothesline thereon.

As shown, the flange 13 is spaced a material distance inwardly from the adjacent side walls 7 and at its peripheral edge the flange 13 is slit and at intervals extends outwardly to provide a series of circumferentially spaced ratchet teeth 16 that extend in a plane parallel to the axis of the reel.

Cooperable with the ratchet teeth 16 for releasably locking the reel against rotation, is a dog 18.

Dog 18 comprises a body plate that is tapered towards one end. At its largest end the body plate of dog 18 is provided with a notch 19 so as to accommodate the shaft 9 and the collar 10 on one end of the shaft. At its smallest end the plate 18 is bent at right angles to provide a lug 21 that extends at right angles to the body plate of the dog and projects outwardly of the casing through a slot 22 provided in the adjacent side wall of the casing 5. At its inner end the lug 21 has a beveled side edge 20 that is adapted to engage with the teeth 16 on the reel in a manner to secure the reel against rotation. It will be apparent that when the lug 21 is in the vertically extending left hand end of the slot 22, the inner portion 20 of the lug will engage with the teeth 16 and consequently the reel will be held against rotative movement. To release the reel, the finger piece 21 is grasped and moved upwardly and then laterally to the other end of the slot 22, thus disengaging the edge 20 from the teeth 16 whereupon the reel is then free to rotate for winding the clothesline 15 or paying out the clothesline when it is found desirable.

For revolving the reel to pay out the clothesline or to wind the line onto the reel, there is provided a suitable handle or crank 23. The crank at one end is provided with a substantially cylindrical head 24 which is adapted to be fitted into one end of the shaft 9 and is equipped with a suitable notch 25 for engagement with a transverse pin 26 provided in said end of the shaft 9, as shown in Figure 3, for operatively connecting the handle with the shaft so that rotative movement of the handle will be imparted to the shaft and consequently to the reel for revolving the latter.

From the above it will be seen that I have provided an encased reel structure particularly designed for use as a clothesline reel and which is characterized by an efficient dog and ratchet mechanism whereby the reel may be either locked in position against rotation or released at the will of the operator. In this connection it will be noted that the plate 18 is held in position between the flange 13 and a suitable filler plate 27 suitably provided on the adjacent side wall 7 at the inner side of the wall.

Having thus described the invention, what is claimed as new is:—

1. In a device of the character described, a casing, a reel rotatably mounted in the casing, said reel being provided at one end thereof with a flange having a circular series of teeth projecting laterally therefrom, a floating dog loosely mounted in said casing between said flange and the adjacent side of said casing, said side of said casing being provided with a slot having downwardly directed ends, and said dog having at its lower end an integral lug projecting laterally therefrom, said lug having an outer end portion projecting outwardly of the casing through said slot, and also having an inner end portion for engaging between adjacent teeth on the reel flange for locking the reel against rotative movement when the said outer end portion of the lug is in one of the aforementioned downwardly directed ends of said slot.

2. In a device of the character described, a casing, a reel rotatably mounted in said casing, said reel having a flange provided with a circular series of teeth struck out therefrom and projecting from the flange in a series concentric to the axis of the reel, a dog including a body plate loosely disposed between said flange and the adjacent side wall of said casing, said body plate having a notch at one end to accommodate the axis of the reel, and being provided at its relatively opposite end with a laterally directed lug, said side of the casing being provided with a slot having an angularly disposed end, and said lug having an inner end adapted to engage with certain of the teeth on the reel, and an outer end adapted to engage in the angularly disposed end of said slot whereby to lock the reel against rotation in either direction.

JOHN R. DOHERTY.